US010220422B2

(12) United States Patent
Giulietti et al.

(10) Patent No.: US 10,220,422 B2
(45) Date of Patent: Mar. 5, 2019

(54) POWDER REMOVAL

(71) Applicant: Hamilton Sundstrand Corporation, Charlotte, NC (US)

(72) Inventors: Diana Giulietti, Tariffville, CT (US); Eric Karlen, Rockford, IL (US); Sergey Mironets, Charlotte, NC (US); Colette O. Fennessy, Bloomfield, CT (US); Kiley J. Versluys, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 416 days.

(21) Appl. No.: 14/924,046

(22) Filed: Oct. 27, 2015

(65) Prior Publication Data

US 2017/0113253 A1   Apr. 27, 2017

(51) Int. Cl.
*B08B 3/12* (2006.01)
*B65G 47/252* (2006.01)
(Continued)

(52) U.S. Cl.
CPC ............... *B08B 3/12* (2013.01); *B08B 3/04* (2013.01); *B08B 3/10* (2013.01); *B08B 9/00* (2013.01); *B29C 64/35* (2017.08); *B65G 47/252* (2013.01); *B65G 57/035* (2013.01); *B65G 57/10* (2013.01); *B65G 57/245* (2013.01); *F15D 1/00* (2013.01);
(Continued)

(58) Field of Classification Search
CPC .... B08B 3/04; B08B 3/10; B08B 3/12; B08B 9/00; B08B 2209/005; B33Y 44/00; B33Y 40/00; F15D 1/00; Y10T 137/0402; Y10T 137/0419; Y10T 137/0424; B65G 47/252; B65G 57/035; B65G 57/10; B65G 57/245; B65G 2203/0283; B65G 2203/0291;
(Continued)

(56) References Cited

U.S. PATENT DOCUMENTS

| 5,340,656 | A | * | 8/1994 | Sachs | B05C 19/04 347/1 |
| 6,019,332 | A | * | 2/2000 | Sweere | A47B 21/00 248/280.11 |
| 6,363,606 | B1 | * | 4/2002 | Johnson, Jr. | B22F 3/008 264/496 |
| 8,828,311 | B2 | * | 9/2014 | Medina | B23K 15/0086 219/121.66 |

(Continued)

FOREIGN PATENT DOCUMENTS

| DE | 102010046579 A1 | 3/2012 |
| JP | 2003225948 A | 8/2003 |

OTHER PUBLICATIONS

Search Report under Section 17, of the UK Intellectual Property Office, dated May 26, 2017, in corresponding GB Application No. GB1618176.0.

*Primary Examiner* — William McCalister
(74) *Attorney, Agent, or Firm* — Locke Lord LLP; Daniel J. Fiorello; Scott D. Wofsy

(57) ABSTRACT

A method includes issuing a state change fluid into an internal passage of an additively manufactured article and causing the state change fluid to change from a first state having a first viscosity to a second state that is either solid or has a second viscosity that is higher than the first viscosity within the internal passage. The method can also include causing the state change fluid to change back from the second state to the first state and flushing the state change (Continued)

fluid from the internal passage to remove residual powder from the additively manufactured article.

14 Claims, 2 Drawing Sheets

(51) Int. Cl.

| | | |
|---|---|---|
| B65G 57/03 | (2006.01) | |
| B65G 57/10 | (2006.01) | |
| B65G 57/24 | (2006.01) | |
| B08B 3/04 | (2006.01) | |
| B08B 3/10 | (2006.01) | |
| B08B 9/00 | (2006.01) | |
| F15D 1/00 | (2006.01) | |
| B29C 64/35 | (2017.01) | |
| B33Y 40/00 | (2015.01) | |
| B22F 5/10 | (2006.01) | |
| B22F 3/105 | (2006.01) | |
| B22F 3/24 | (2006.01) | |

(52) U.S. Cl.
CPC ........... *B08B 2209/005* (2013.01); *B22F 5/10* (2013.01); *B22F 2003/1059* (2013.01); *B22F 2003/247* (2013.01); *B22F 2999/00* (2013.01); *B33Y 40/00* (2014.12); *B65G 2203/0283* (2013.01); *B65G 2203/0291* (2013.01)

(58) Field of Classification Search
CPC ............... B22F 5/10; B22F 2003/1059; B22F 2003/247; B22F 2999/00; B29C 64/35
USPC ................................ 137/15.01, 15.04, 15.05
See application file for complete search history.

(56) References Cited

U.S. PATENT DOCUMENTS

| | | | | |
|---|---|---|---|---|
| 9,101,321 | B1* | 8/2015 | Kieser | A61B 17/7004 |
| 2005/0038520 | A1* | 2/2005 | Binette | A61F 2/30756 |
| | | | | 623/18.11 |
| 2012/0310151 | A1* | 12/2012 | Takahata | A61M 5/44 |
| | | | | 604/58 |
| 2014/0150814 | A1* | 6/2014 | Peltz | B08B 3/10 |
| | | | | 134/1 |
| 2014/0220173 | A1* | 8/2014 | Quinonez | F04B 19/006 |
| | | | | 425/546 |
| 2014/0341675 | A1* | 11/2014 | Dobbin | B64D 45/02 |
| | | | | 411/82.1 |
| 2015/0060403 | A1* | 3/2015 | Carter | F02C 7/30 |
| | | | | 216/53 |
| 2015/0077215 | A1* | 3/2015 | Ranky | B29C 70/88 |
| | | | | 338/47 |
| 2015/0102523 | A1* | 4/2015 | Russell | B28B 7/0091 |
| | | | | 264/255 |
| 2015/0129688 | A1* | 5/2015 | Buchanan | B23K 26/388 |
| | | | | 239/589 |
| 2015/0157822 | A1* | 6/2015 | Karpas | B29C 33/52 |
| | | | | 128/206.24 |
| 2015/0184688 | A1* | 7/2015 | Dobbin | F16B 39/021 |
| | | | | 411/82.1 |
| 2015/0217059 | A1* | 8/2015 | Ashby | A61M 5/31511 |
| | | | | 604/189 |
| 2015/0275916 | A1* | 10/2015 | Marshall | F01D 17/162 |
| | | | | 415/148 |
| 2016/0067778 | A1* | 3/2016 | Liu | B22F 3/1055 |
| | | | | 419/53 |

* cited by examiner

POWDER REMOVAL

BACKGROUND

1. Field

The present disclosure relates to additive manufacturing methods and systems, more specifically to methods and systems for powder removal for additively manufactured articles.

2. Description of Related Art

Certain methods for additive manufacturing using powder beds (e.g., selective laser sintering) cause powder to be left within internal passages of the additively manufactured article. Traditional methods for removing of such remaining powder can damage internal passages, lead to material weakness in the additively manufactured part, and/or leave excessive amounts of residual powder within the internal passages. The ability to effectively remove powder from certain types and/or sizes of internal features is a limiting design factor for AM articles.

Such conventional methods and systems have generally been considered satisfactory for their intended purpose. However, there is still a need in the art for improved powder removal for additively manufactured articles. The present disclosure provides a solution for this need.

SUMMARY

A method includes issuing a state change fluid into an internal passage of an additively manufactured article and causing the state change fluid to change from a first state having a first viscosity to a second state that is either solid or has a second viscosity that is higher than the first viscosity within the internal passage. The method can also include causing the state change fluid to change back from the second state to the first state and flushing the state change fluid from the internal passage to remove residual powder from the additively manufactured article.

The method can include applying vibration, such as ultrasonic vibration, to the additively manufactured article while the state change fluid is in the second state. Causing the state change fluid to change from the first state to the second state can include applying heat to the state change fluid. For example, the state change fluid can include poly(N-isopropylacrylamide) or any other suitable thermal-responsive polymer that becomes more viscous or solidifies with added heat.

Causing the state change fluid to change from the first state to the second state can include cooling the state change fluid. For example, the state change fluid can include an ionic liquid that is crystalline at room temperature and melts to freely flow above room temperature. In certain embodiments, the ionic liquid can include [bmim]NTf$_2$. In such embodiments, the method can further include heating the ionic liquid to change the ionic liquid from the second state to the first state before inputting the ionic liquid into the internal passage.

Causing the state change fluid to change from the first state to the second state can include applying a pressure or force to the state change fluid. For example, the state change fluid can include a non-Newtonian fluid that becomes more viscous or rigid with applied kinetic energy.

Inputting the state change fluid can include applying a pressure to the state change fluid. Causing the state change fluid to change from the first state to the second state can include removing the applied pressure or reducing pressure to the state change fluid. For example, the state change fluid can include a non-Newtonian fluid that flows more freely with higher pressure (e.g., a clay suspension).

In accordance with at least one aspect of this disclosure, an additively manufactured article includes an internal passage, the internal passages being cleared of residual powder by any suitable portion or combination of portions of a method as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
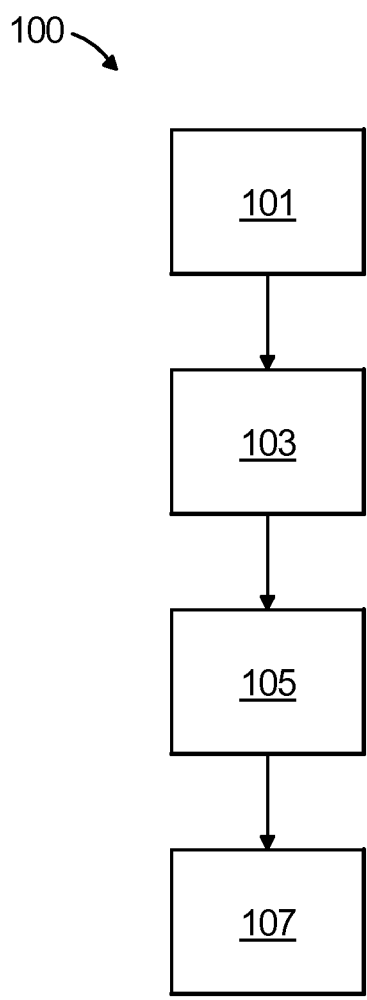
FIG. 1 is a flowchart of an embodiment of a method in accordance with this disclosure.
Figure 2:
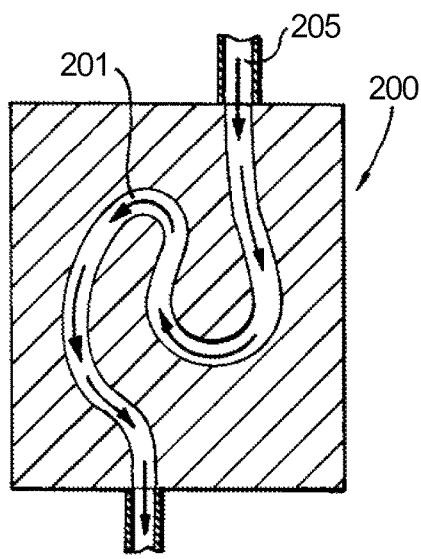
FIG. 2 is a cross-sectional elevation view of an embodiment of an additively manufactured article having an internal flow passage, showing a state change fluid flowing therethrough in a first state.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-3B. The systems and methods described herein can be used to remove residual powder from within internal passages of additively manufactured articles, for example.

Referring to FIGS. 1 and 2-3B, a method 100 includes inputting (e.g., at block 101) a state change fluid 205 into an internal passage 201 of an additively manufactured article 200. The method 100 also includes causing (e.g., at block 103) the state change fluid 205 to change from a first state having a first viscosity (e.g., as shown in FIG. 2) to a second state that is either solid (e.g., as shown FIG. 3A) or has a second viscosity that is higher than the first viscosity (e.g., as shown in FIG. 3B) while the state change fluid 205 is within the internal passage 201.

The method 100 can also include causing (e.g., at block 105) the state change fluid 205 to change back from the second state (e.g., FIG. 3A and/or FIG. 3B) to the first state (e.g., FIG. 2). After converting back to the first state, the method 100 can include flushing (e.g., at block 107) the state change 205 fluid from the internal passage 201 to remove residual powder from the additively manufactured article 200.

Figure 3A:
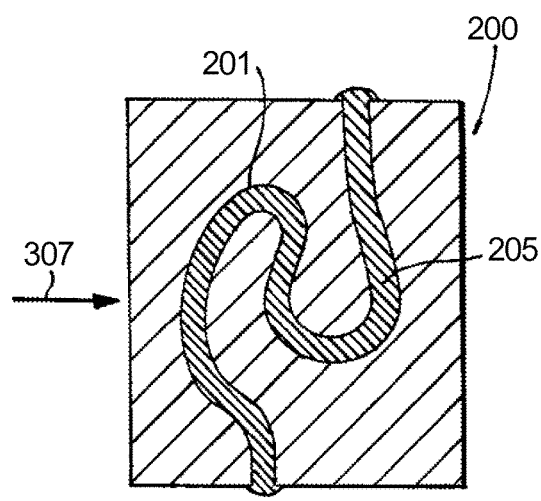
FIG. 3A is a cross-sectional elevation view of an the additively manufactured article of FIG. 2, showing the state change fluid converted to a substantially solid form in an embodiment of a second state in accordance with this disclosure.
Figure 3B:
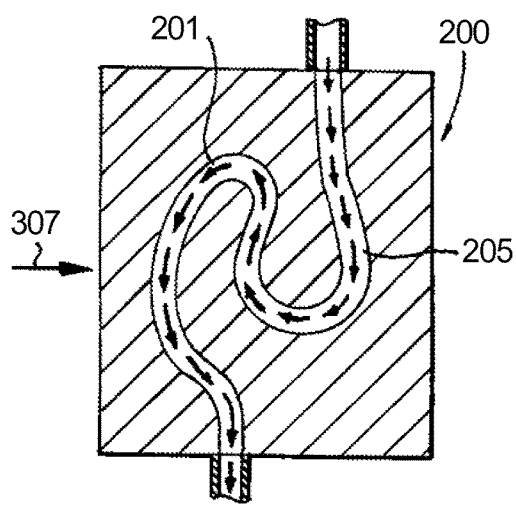
FIG. 3B is a cross-sectional elevation view of an the additively manufactured article of FIG. 2, showing the state change fluid converted to a more viscous state in another embodiment of a second state in accordance with this disclosure.

Referring to FIGS. 3A and 3B, the method 100 can include applying vibration 307 to the additively manufactured article 200 while the state change fluid 205 is in the second state. In certain embodiments, the vibration can be ultrasonic vibration. Any other suitable mode of vibration is contemplated herein and any type of transducer for vibration can be used to vibrate the additively manufactured article 200 and/or the state change fluid 205 within the internal passage 201.

In certain embodiments, causing the state change fluid 205 to change from the first state to the second state can include applying heat to the state change fluid 205. For example, the state change 205 fluid can include poly(N-isopropylacrylamide) or any other suitable thermal-responsive polymer that becomes more viscous and/or solidifies with added heat.

Causing the state change fluid to change 205 from the first state to the second state can include cooling the state change fluid 205. For example, the state change fluid 205 can include an ionic liquid that is crystalline at room temperature and melts to freely flow above room temperature. In certain embodiments, the ionic liquid can include [bmim]NTf$_2$. In such embodiments, the method 100 can further include heating the ionic liquid to change the ionic liquid from the second state to the first state before inputting the ionic liquid into the internal passage 201.

In certain embodiments, causing the state change fluid 205 to change from the first state to the second state includes applying a pressure or force to the state change fluid 205. For example, the state change fluid 205 can include a non-Newtonian fluid that becomes more viscous and/or rigid with applied kinetic energy (e.g., cornstarch in water).

In certain embodiments, inputting the state change fluid 205 includes applying a pressure to the state change fluid 205. Causing the state change fluid 205 to change from the first state to the second state can include removing the applied pressure or reducing pressure to the state change fluid 205. For example, the state change fluid 205 can include a non-Newtonian fluid that flows more freely with higher pressure (e.g., a clay suspension).

In accordance with at least one aspect of this disclosure, an additively manufactured article 200 includes an internal passage 201, the internal passage 201 being cleared of residual powder by any suitable portion or combination of portions of a method 100 as described above.

Embodiments as described above allow for more effective powder removal than traditional methods and systems. Increasing the viscosity of a flushing fluid (e.g., the state change fluid 205) can allow the flushing to be more effective. For example, vibrating the article 200 after changing to a more viscous or solid state translates the vibration energy to powder particles that are stuck inside the internal passage. This increase as energy translation improves particle separation from the internal passage, thereby cleaning out the internal passage better without the need for corrosive or abrasive solutions which can comprise the integrity of the article 200. This also allows for additive manufacturing design freedom not previously attainable with traditional techniques.

The methods and of the present disclosure, as described above and shown in the drawings, provide for additively manufactured articles with superior properties including improved residual powder removal from internal passages therein. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
   filling an internal passage of an additively manufactured article with a state change fluid; and
   causing all of the state change fluid to change from a first state having a first viscosity to a second state that is either solid or has a second viscosity that is higher than the first viscosity within the internal passage;
   causing the state change fluid to change back from the second state to the first state; and
   removing residual powder from the additively manufactured article by flushing the state change fluid from the internal passage.

2. The method of claim 1, further comprising applying vibration to the additively manufactured article while the state change fluid is in the second state.

3. The method of claim 2, wherein the vibration is ultrasonic vibration.

4. The method of claim 1, wherein causing the state change fluid to change from the first state to the second state includes applying heat to the state change fluid.

5. The method of claim 4, wherein the state change fluid includes poly(N-isopropylacrylamide).

6. The method of claim 1, wherein causing the state change fluid to change from the first state to the second state includes cooling the state change fluid.

7. The method of claim 6, wherein the state change fluid includes an ionic liquid that is crystalline at room temperature and melts to freely flow above room temperature.

8. The method of claim 7, wherein the ionic liquid includes [bmim]NTf$_2$.

9. The method of claim 7, further comprising heating the ionic liquid to change the ionic liquid from the second state to the first state before inputting the ionic liquid into the internal passage.

10. The method of claim 1, wherein causing the state change fluid to change from the first state to the second state includes applying a pressure or force to the state change fluid.

11. The method of claim 1, wherein issuing the state change fluid includes applying a pressure to the state change fluid.

12. The method of claim 11, wherein causing the state change fluid to change from the first state to the second state includes removing an applied pressure or reducing pressure to the state change fluid.

13. The method of claim 12, wherein the state change fluid includes a non-Newtonian fluid that flows more freely with higher pressure.

14. The method of claim 13, wherein the state change fluid includes a clay suspension.

* * * * *